US011889261B2

(12) United States Patent
Liu et al.

(10) Patent No.: US 11,889,261 B2
(45) Date of Patent: Jan. 30, 2024

(54) ADAPTIVE BEAMFORMER FOR ENHANCED FAR-FIELD SOUND PICKUP

(71) Applicant: Bose Corporation, Framingham, MA (US)

(72) Inventors: Yang Liu, Boston, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/495,120

(22) Filed: Oct. 6, 2021

(65) Prior Publication Data

US 2023/0104070 A1 Apr. 6, 2023

(51) Int. Cl.
*H04R 1/32* (2006.01)
*H04R 3/00* (2006.01)

(52) U.S. Cl.
CPC ............ *H04R 1/326* (2013.01); *H04R 3/005* (2013.01)

(58) Field of Classification Search
CPC ...... H04R 1/326; H04R 1/406; H04R 29/005; H04R 3/005; H04R 2201/401; H04R 2201/403; H04R 2201/405; H04R 2430/25; G10K 11/34
USPC ................................ 381/56, 58, 91, 92, 122
See application file for complete search history.

(56) References Cited

U.S. PATENT DOCUMENTS 6,836,243 B2 12/2004 Kajala et al.
7,028,269 B1 4/2006 Cohen-Solal et al.
7,995,771 B1 8/2011 Faltys et al.
9,591,411 B2 3/2017 Jensen et al.
10,311,889 B2 6/2019 Ganeshkumar et al.
10,547,937 B2 1/2020 Abrams et al.
2003/0009329 A1 1/2003 Stahl et al.
2004/0001598 A1 1/2004 Balan et al.
2004/0114772 A1 6/2004 Zlotnick
2005/0047611 A1* 3/2005 Mao ....................... H04R 3/005 381/92
2005/0149320 A1 7/2005 Kajala et al.
2008/0232607 A1* 9/2008 Tashev ................. H04B 7/0854 342/381
2008/0259731 A1 10/2008 Happonen
2011/0064232 A1 3/2011 Ruwisch
(Continued)

OTHER PUBLICATIONS

PCT International Search Report and Written Opinion for International Application No. PCT/US2022/045842, dated Jan. 27, 2023, 14 pages.

*Primary Examiner* — William A Jerez Lora
(74) *Attorney, Agent, or Firm* — Hoffman Warnick LLC

(57) ABSTRACT

Various implementations include approaches for sound enhancement in far-field pickup. Certain implementations include a method of sound enhancement for a system including microphones for far-field pick up. The method can include: generating, using at least two microphones, a primary beam focused on a previously unknown desired signal look direction, the primary beam producing a primary signal configured to enhance the desired signal; generating, using at least two microphones, a reference beam focused on the desired signal look direction, the reference beam producing a reference signal configured to reject the desired signal; and removing, using at least one processor, components that correlate to the reference signal from the primary signal.

20 Claims, 3 Drawing Sheets

(56) References Cited

U.S. PATENT DOCUMENTS

| | | | | |
|---|---|---|---|---|
| 2012/0027241 | A1* | 2/2012 | Turnbull ................ | H04R 1/086 381/361 |
| 2012/0134507 | A1 | 5/2012 | Dimitriadis et al. | |
| 2012/0183149 | A1* | 7/2012 | Hiroe ...................... | G10L 25/48 381/56 |
| 2014/0056435 | A1* | 2/2014 | Kjems ..................... | G10L 15/20 381/317 |
| 2014/0098240 | A1 | 4/2014 | Dimitriadis et al. | |
| 2014/0362253 | A1 | 12/2014 | Kim et al. | |
| 2015/0199172 | A1 | 7/2015 | Ringuette et al. | |
| 2015/0245133 | A1* | 8/2015 | Kim ....................... | H04N 7/147 381/92 |
| 2015/0371529 | A1 | 12/2015 | Dolecki | |
| 2016/0142548 | A1 | 5/2016 | Pandey et al. | |
| 2017/0074977 | A1 | 3/2017 | Koudar et al. | |
| 2018/0014130 | A1* | 1/2018 | Lunner ................... | A61F 11/06 |
| 2018/0122399 | A1* | 5/2018 | Janse .................. | G10L 21/0208 |
| 2018/0218747 | A1* | 8/2018 | Moghimi ................ | G10L 25/81 |
| 2019/0130885 | A1 | 5/2019 | Kemmerer et al. | |
| 2020/0137487 | A1 | 4/2020 | Abrams et al. | |

* cited by examiner

ADAPTIVE BEAMFORMER FOR ENHANCED FAR-FIELD SOUND PICKUP

TECHNICAL FIELD

This disclosure generally relates to audio devices and systems. More particularly, the disclosure relates to beamforming in audio devices.

BACKGROUND

Various audio applications benefit from effective sound (i.e., audio signal) pickup. For example, effective voice pickup and/or noise suppression can enhance audio communication systems, audio playback, and situational awareness of audio device users. However, conventional audio devices and systems can fail to adequately pick up (or, detect and/or characterize) audio signals, particularly far field audio signals.

SUMMARY

All examples and features mentioned below can be combined in any technically possible way.

Various implementations include enhancing far-field sound pickup. Particular implementations utilize an adaptive beamformer to enhance far-field sound pickup, such as far-field voice pickup.

In some particular aspects, a method of sound enhancement for a system having microphones for far-field pick up includes: generating, using at least two microphones, a primary beam focused on a previously unknown desired signal look direction, the primary beam producing a primary signal configured to enhance the desired signal; generating, using at least two microphones, a reference beam focused on the desired signal look direction, the reference beam producing a reference signal configured to reject the desired signal; and removing, using at least one processor, components that correlate to the reference signal from the primary signal.

In some particular aspects, a system includes: a plurality of microphones for far-field pickup; and at least one processor configured to: generate, using at least two of the microphones, a primary beam focused on a previously unknown desired signal look direction, the primary beam producing a primary signal configured to enhance the desired signal, generate, using at least two of the microphones, a reference beam focused on the desired signal look direction, the reference beam producing a reference signal configured to reject the desired signal, and remove components that correlate to the reference signal from the primary signal.

Implementations may include one of the following features, or any combination thereof.

In certain implementations, the method further includes: prior to generating at least one of the primary beam or the reference beam, determining whether the desired signal activity is detected in an environment of the system.

In some cases, the desired signal relates to voice and the determination of whether voice is detected in the environment of the system includes using voice activity detector processing.

In particular aspects, generating the reference beam uses the same at least two microphones used to generate the primary beam.

In some implementations, at least one of the primary beam or the reference beam is generated using in-situ tuned beamformers.

In certain aspects, the desired signal look direction is selected by a user via manual input.

In particular cases, the desired signal look direction is selected automatically using source localization and beam selector technologies.

In some aspects, the method further includes: prior to removing the components that correlate to the reference signal from the primary signal, generating, using at least two microphones, multiple beams focused on different directions to assist with selecting the primary beam for producing the primary signal.

In particular implementations, the method further includes: removing, using the at least one processor, audio rendered by the system from the primary and reference signals via acoustic echo cancellation.

In certain cases, the system includes at least one of a wearable audio device, a hearing aid device, a speaker, a conferencing system, a vehicle communication system, a smartphone, a tablet, or a computer.

In some aspects, removing from the primary signal components that correlate to the reference signal includes filtering the reference signal to generate a noise estimate signal and subtracting the noise estimate signal from the primary signal.

In particular cases, the method further includes enhancing the spectral amplitude of the primary signal based upon the noise estimate signal to provide an output signal.

In some implementations, filtering the reference signal includes adaptively adjusting filter coefficients.

In certain aspects, adaptively adjusting filter coefficients includes at least one of a background process or monitoring when speech is not detected.

In particular cases, generating at least one of the primary beam or the reference beam includes using superdirective array processing.

In some aspects, the method further includes deriving the reference signal using a delay-and-subtract speech cancellation technique from the at least two microphones used to generate the reference beam.

In certain implementations, the desired signal relates to speech.

In particular cases, the desired signal does not relate to speech.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
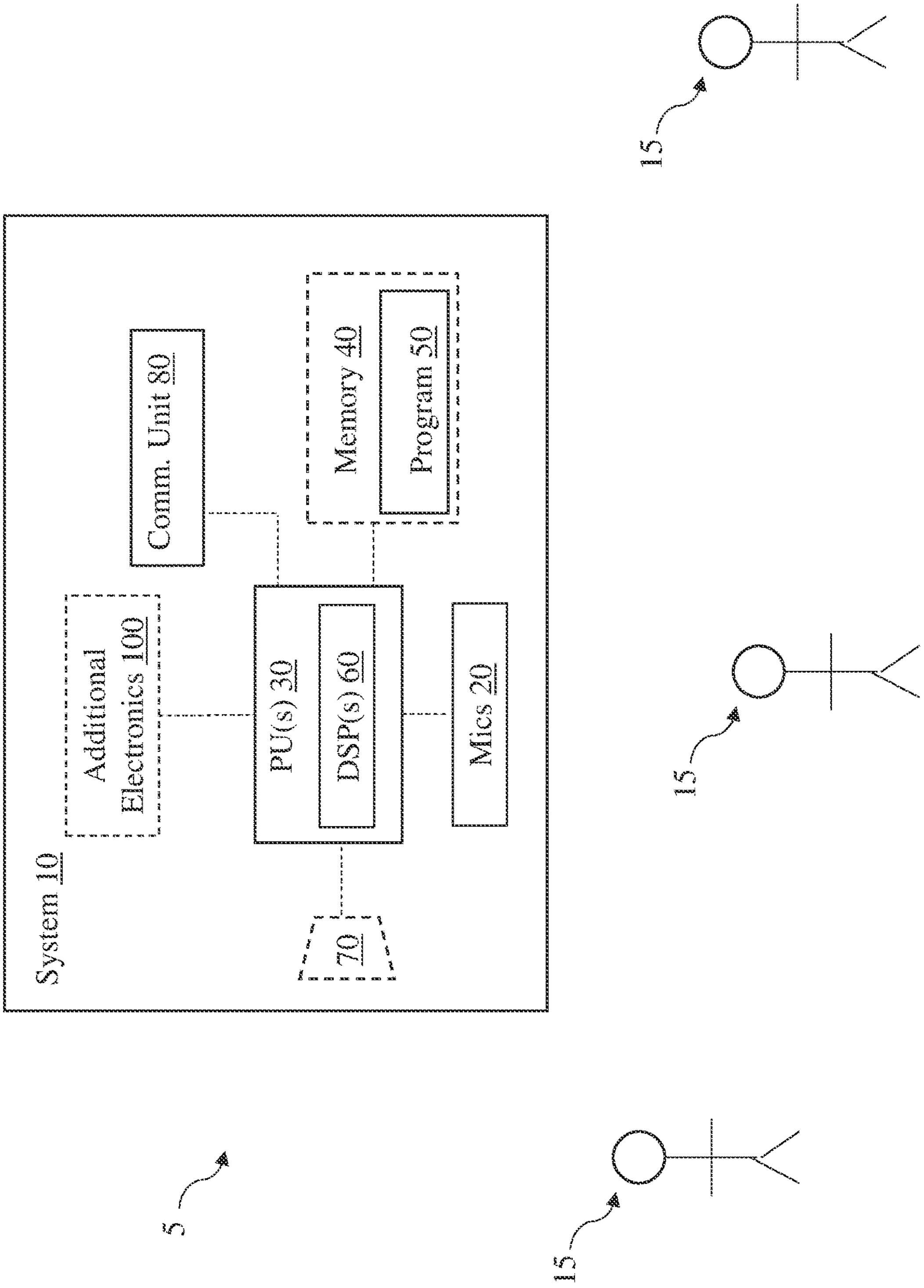
FIG. 1 is a schematic block diagram of a system in an environment according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that far field sound pickup can be enhanced using an adaptive beamformer. For example, approaches can include generating dual beams, one focused to enhance the desired signal look direction (e.g., primary sound beam, such as primary speech beam), and the second to reject the desired signal only (e.g., null beam for noise reference). The approaches also include performing adaptive signal processing to these beams to enhance pickup from the desired signal look direction.

In particular cases, such as in fixed installation uses and/or scenarios where a signal processing system can be trained, in-situ tuned beamformers are used to enhance sound pickup. In additional cases, a beam selector can be deployed to select a desired signal look direction. In still further cases, approaches include receiving a user interface command to define the desired signal look direction. The approaches disclosed according to various implementations can be employed in systems including wearable audio devices, fixed devices such as fixed installation-type audio devices, transportation-type devices (e.g., audio systems in automobiles, airplanes, trains, etc.), portable audio devices such as portable speakers, multimedia systems such as multimedia bars (e.g., soundbars and/or video bars), audio and/or video conferencing systems, and/or microphone or other sound pickup systems configured to work in conjunction with an audio and/or video system.

As used herein the term "far field" or "far-field" refers to a distance (e.g., between microphone(s) and sound source) of approximately at least one meter (or, three to five wavelengths). In contrast to certain conventional approaches for enhancing near field sound pickup (e.g., user voice pickup in a wearable device that is only centimeters from a user's mouth), various implementations are configured to enhance sound pickup at a distance of three or more wavelengths from the source. In particular cases, the digital signal processor used to process far field signals uses automatic echo cancelation (AEC) and/or beamforming in order to process far field signals detected by system microphones. The terms "look direction" and "signal look direction" can refer to the direction such as an approximately straight-line direction, between a set of microphones and a given sound source or sources. As described herein, aspects can include enhancing (e.g., amplifying and/or improving signal-to-noise ratio) acoustic signals from a desired signal look direction, such as the direction from which a user is speaking in the far field.

Commonly labeled components in the FIGURES are considered to be substantially equivalent components for the purposes of illustration, and redundant discussion of those components is omitted for clarity.

FIG. 1 shows an example of an environment 5 including a system 10 according to various implementations. In certain implementations, the system 10 includes an audio system, such as an audio device configured to provide an acoustic output as well as detect far field acoustic signals. However, as noted herein, the system 10 can function as a stand-alone acoustic signal processing device, or as part of a multimedia and/or audio/visual communication system. Examples of a system 10 or devices that can employ the system 10 or components thereof include, but are not limited to, a headphone, a headset, a hearing aid device, an audio speaker (e.g., portable and/or fixed, with or without "smart" device capabilities), an entertainment system, a communication system, a conferencing system, a smartphone, a tablet, a personal computer, a vehicle audio and/or communication system, a piece of exercise and/or fitness equipment, an out-loud (or, open-air) audio device, a wearable private audio device, and so forth. Additional devices employing the system 10 can include a portable game player, a portable media player, an audio gateway, a gateway device (for bridging an audio connection between other enabled devices, such as Bluetooth devices)), an audio/video (A/V) receiver as part of a home entertainment or home theater system, etc. In various implementations, the environment 5 can include a room, an enclosure, a vehicle cabin, an outdoor space, or a partially contained space.

The system 10 is shown including a plurality of microphones (mics) 20 for far-field acoustic signal (e.g., sound) pickup. In certain implementations, the plurality of microphones 20 includes at least two microphones. In particular cases, the microphones 20 include an array of three, four, five or more microphones (e.g., up to eight microphones). In additional cases, the microphones 20 include multiple arrays of microphones. The system 10 further includes at least one processor, or processor unit (PU(s)) 30, which can be coupled with a memory 40 that stores a program (e.g., program code) 50 for performing far field sound enhancement according to various implementations. In some cases, memory 40 is physically co-located with processor(s) 30, however, in other implementations, the memory 40 is physically separated from the processor(s) 30 and is otherwise accessible by the processor(s) 30. In some cases, the memory 40 may include a flash memory and/or non-volatile random access memory (NVRAM). In particular cases, memory 40 stores: a microcode of a program (e.g., far field sound processing program) 50 for processing and controlling the processor(s) 30, and may also store a variety of reference data. In certain cases, the processor(s) 30 include one or more microprocessors and/or microcontrollers for executing functions as dictated by program 50. In certain cases, processor(s) 30 include at least one digital signal processor (DSP) 60 configured to perform signal processing functions described herein. In certain cases, the DSP(s) 60 may be implemented as a chipset of chips that include separate and multiple analog and digital processors. In particular cases, when the instructions 50 are executed by the processor(s), the DSP 60 performs functions described herein. In certain cases, the processor(s) 30 are also coupled to one or more electro-acoustic transducer(s) 70 for providing an audio output. The system 10 can include a communication unit 80 in some cases, which can include a wireless (e.g., Bluetooth module, Wi-Fi module, etc.) and/or hardwired (e.g., cabled) communication system. The system 10 can also include additional electronics 100, such as a power manager and/or power source (e.g., battery or power connector), memory, sensors (e.g., inertial measurement unit(s) (IMU(s)), accelerometers/gyroscope/magnetometers, optical sensors, voice activity detection systems), etc. Certain of the above-noted components depicted in FIG. 1 are optional, or optionally co-located with the processor(s) 20 and microphones 30, and are displayed in phantom.

Figure 2:
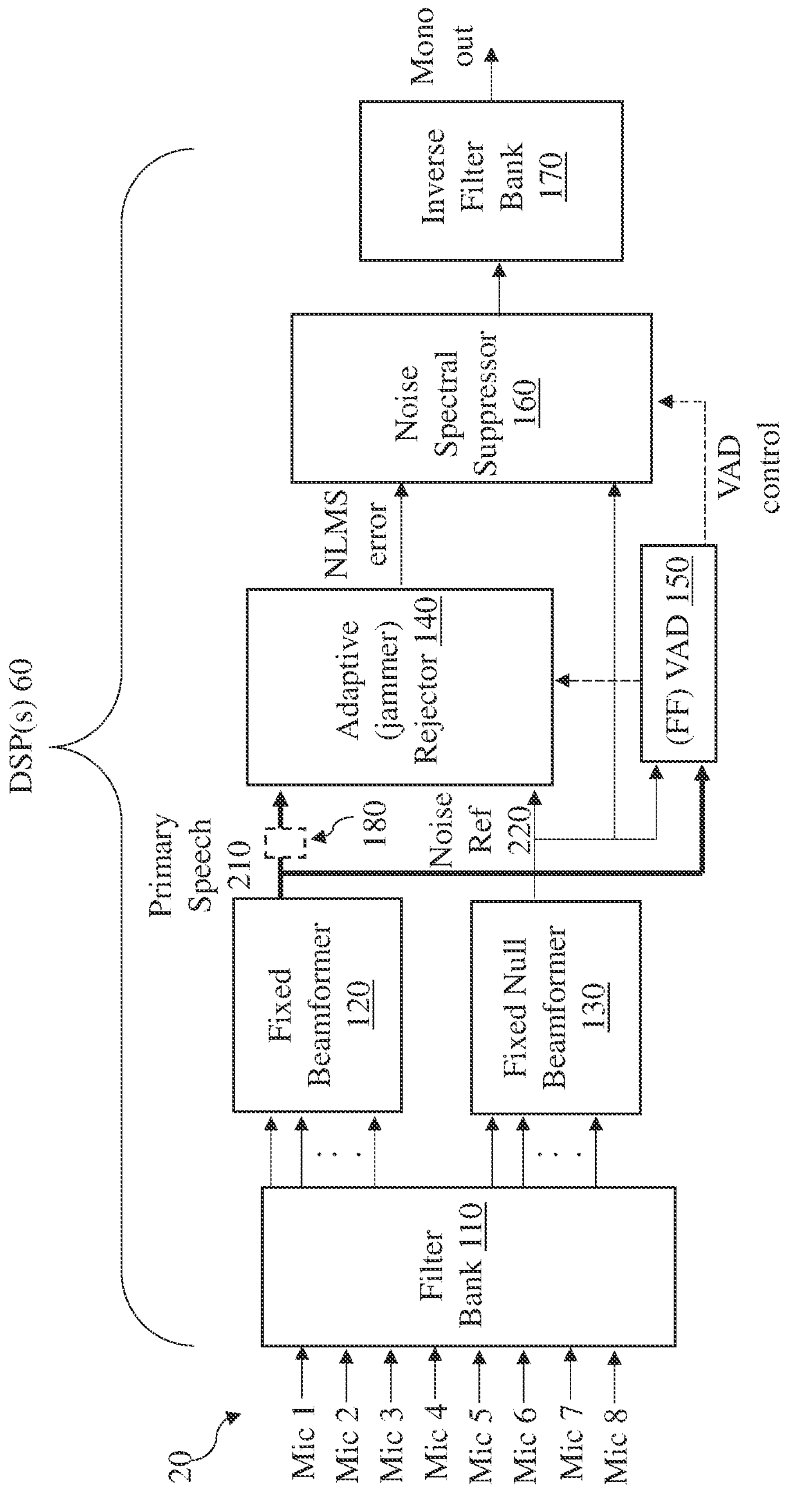
FIG. 2 is a block diagram illustrating signal processing functions in the system of FIG. 1 according to various implementations.

In certain cases, the processor(s) 30 execute the program 50 to take actions using, for example, the digital signal processor (DSP) 60. FIG. 2 is a block diagram of an example signal processing system in the DSP 60 that executes functions according to program 50, e.g., in order to enhance sound pickup in far field acoustic signals. FIG. 2 is referred to in concert with FIG. 1.

As illustrated in FIG. 2, the DSP 60 can include a filter bank 110 that receives acoustic input signals from the microphones 20, and two distinct beamformers, namely, a fixed beamformer 120 and a fixed null beamformer 130, that receive filtered signals from the filter bank 110. The fixed beamformer 120 provides a primary speech signal (Primary Speech) to both an adaptive (jammer) rejector 140 and a feedforward (FF) voice activity detector (VAD) 150. The fixed null beamformer 130 provides a noise reference signal (Noise Ref.) to the adaptive rejector 140, the feedforward VAD 150, and a noise spectral suppressor 160. The adaptive (jammer) rejector 140 provides a normalized least-mean-squares (NLMS) error signal that contains the primary speech signal 210 with components removed that are correlated with the noise reference signal 220. The noise spectral suppressor 160 then provides an output signal to an inverse filter bank 170 for monoaural audio output. In some cases, the DSP 60 includes an echo canceler 180 (shown in phantom as optional) between the fixed beamformer 120 and the adaptive rejector 140, e.g., for canceling echoes in the primary speech signal 210.

Figure 3:
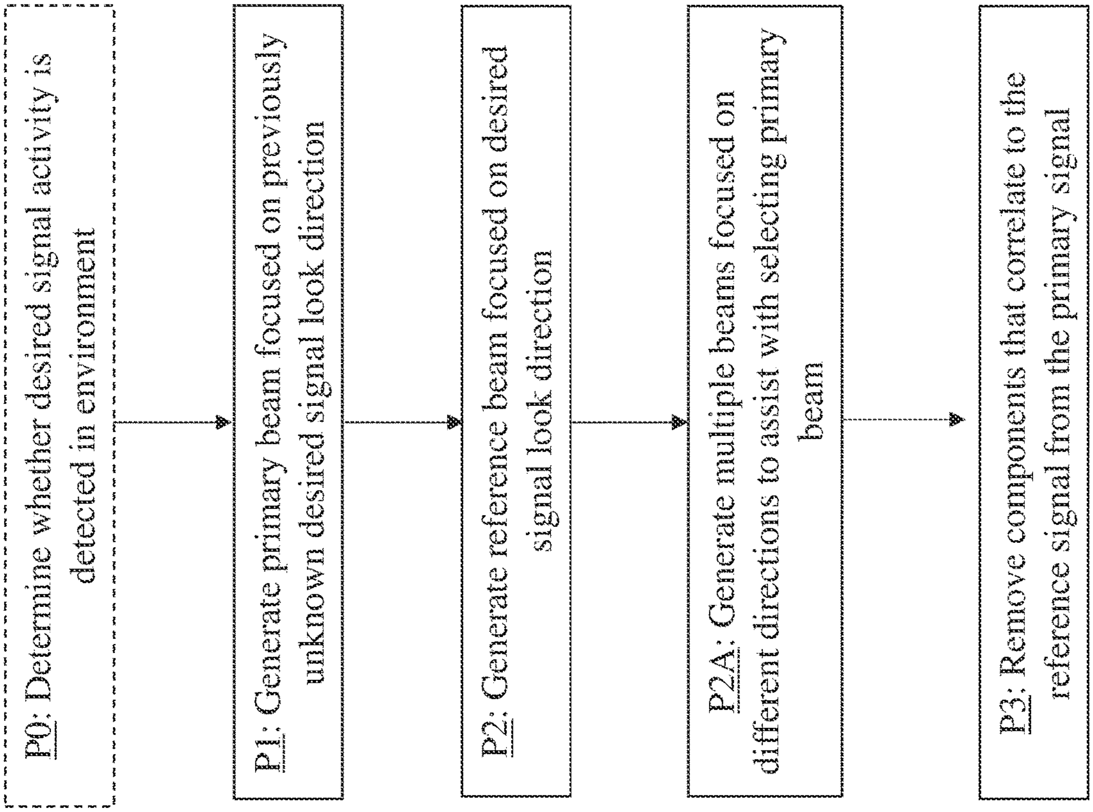
FIG. 3 is a flow diagram illustrating processes in a method performed according to various implementations.

FIG. 3 illustrates processes performed by signal processing system in the DSP 60 according to a particular implementation, and is referred to in concert with the block diagram of that system in FIG. 2. It is understood that the processes illustrated and described with reference to FIG. 3 can be performed in a different order than depicted, and/or concurrently in some cases. In various implementations, the processes include:

P1: generating, using at least two of the microphones 20, a primary beam focused on a previously unknown desired signal look direction. In various implementations, e.g., as illustrated in FIG. 2, the primary beam produces a primary signal 210 configured to enhance the desired signal.

In certain cases, the desired signal look direction can be selected automatically using a beam selector. For example, the DSP 60 can include a beam selector (not shown) between the filter bank 110 and the fixed beamformer 120 that is configured to receive manual beam control commands, e.g., from a user interface or a controller. In these cases, a user can select the signal look direction based on a known direction of a far field sound source relative to the system 10. However, in other cases, the beam selector is configured to automatically (e.g., without user interaction) select the desired signal look direction. In these cases, the beam selector can select a desired signal look direction based on one or more selection factors relating to the input signal detected by microphones 20, which can include signal power, sound pressure level (SPL), correlation, delay, frequency response, coherence, acoustic signature (e.g., a combination of SPL and frequency), etc. In additional cases, the beam selector includes a machine learning engine (e.g., a trainable logic engine and/or artificial neural network) that can select the desired signal look direction based on feedback from prior signal look direction selections, e.g., similar known look directions selected in the past, and/or known prior null directions. In still further cases, the beam selector performs a progressive adjustment to the beam width based on one or more selection factors, e.g., initially selecting a wide beam width (and canceling a remaining portion of the environment 5), and narrowing the beam width as successive selection factors are reinforced, e.g., successively receiving high power signals or acoustic signatures matching a desired sound profile such as a user's speech.

P2: generating, using at least two of the microphones 20, a reference beam focused on the desired signal look direction. In various implementations, e.g., as illustrated in FIG. 2, the reference beam produces a reference signal (Noise Ref) 220 configured to reject the desired signal. In particular cases, generating the reference beam uses the same two (or more) microphones 20 that are used to generate the primary beam. For example, in a microphone array having six, seven, or eight microphones, the same two, three, four, five, or more microphones 20 are used to generate both the reference beam and the primary beam. In certain cases, the reference signal 220 is derived using a delay-and-subtract technique from the two or more microphones 20 used to generate the reference beam.

In some implementations, generating the primary beam and/or reference beam includes using super-directive array processing algorithms that enhance (e.g., maximize) the speech to noise signal to noise (SNR) ratio or directivity, such as generalized eigenvalue (GEV) solver or minimum variance distortionless response (MVDR) solver.

In certain cases, in an optional process P2A includes generating, using at least two of the microphones 20 (FIG. 1), multiple beams focused on different directions to assist with selecting the primary beam for producing the primary signal. This process can be beneficial in a number of scenarios, including for example, where a given user (e.g., one of users 15 in FIG. 1) is walking around the environment 5 and talking. This process P2A can also be beneficial in scenarios where multiple users 15 (FIG. 1) will be talking and it is desirable to enhance speech from two or more of those users 15.

In various implementations, process P2A is performed prior to a subsequent process P3, which includes: removing components that correlate to the reference signal 220 from the primary signal 210. In various implementations, removing components that correlate to the reference signal 220 from the primary signal 210 (e.g., to generate the NLMS error signal) includes: a) filtering the reference signal to generate a noise estimate signal and b) subtracting the noise estimate signal from the primary signal. In certain of these cases, the process further includes enhancing the spectral amplitude of the primary signal 210 based on the noise estimate signal to provide an output signal. In certain cases, filtering the reference signal includes adaptively adjusting filter coefficients, which can include, for example, at least one of a background process or monitoring when speech is not detected. Additional aspects of removing components that correlate to the reference signal 220 from the primary signal 210 are described in U.S. Pat. No. 10,311,889 ("Audio Signal Processing for Noise Reduction," or the '889 Patent), herein incorporated by reference in its entirety.

In certain implementations, e.g., with respect to FIG. 1, prior to generating the primary beam focused on a previously unknown desired signal look direction (process P1), in an optional pre-process P0 (illustrated in phantom), the DSP 60: determines whether the desired signal activity is detected in the environment 5 of the system 10. For example, the desired signal can relate to voice, e.g., a voice of a user 15 or multiple user(s) 15 in the environment 5. In certain cases, the determination of whether voice is detected in the environment of the system includes using VAD processing, e.g., the feedforward VAD 150 in FIG. 2. In certain cases, the feedforward VAD 150 compares the primary beam signal (primary speech signal 210) to the null beam signal (noise reference signal 220) to detect voice activity. Other approaches can include deploying a nullforming approach (or nullformer) to detect and localize new signals that include voice signals. Nullforming is described in further detail in U.S. patent application Ser. No. 15/800,909 ("Adaptive Nullforming for Selective Audio Pick-Up," corresponding to US Patent Application Publication No. 2019/0130885), which is incorporated by reference in its entirety. In still further implementations, voice activity can be detected using a conventional voice/signal detection algorithm, e.g., where interfering noise sources can be assumed to be stationary. For example, in an environment 5 that includes fixed, known noise sources such as heating and/or cooling systems, appliances, etc., a voice/signal detection algorithm can be reliably deployed to detect voice activity in signals from the environment 5.

In some cases, e.g., where multiple users 15 are present in an environment 5, the system 10 can be configured to generate multiple primary beams associated with each of the users 15, e.g., for voice pickup from two or more users 15 in the room. These implementations can be beneficial, e.g., in conferencing scenarios, meeting scenarios, etc. In additional cases, the system 10 can be configured to adjust the primary and/or reference beam direction based on user movement within the environment 5. For example, the system 10 can adjust the primary and/or reference beam direction by looking at multiple candidate beams to select a beam associated with the user's speech (e.g., a beam with a particular acoustic signature and/or signal strength), mixing multiple candidate beams (e.g., beams determined to be proximate to the user's last-known speaking direct), or performing source (e.g., user 15) tracking with a location tracking system such as an optical system (e.g., camera) and/or a location identifier such as a locating tracking system on an electronic device that is on or otherwise carried by the user (e.g., smartphone, smart watch, wearable audio device, etc.). Examples of location-based tracking systems such as beacons and/or wearable location tracking systems are described in U.S. Pat. No. 10,547,937 and U.S. patent application Ser. No. 16/732,549 (both entitled, "User-Controlled Beam Steering in Microphone Array"), each of which is incorporated by reference in its entirety.

In particular implementations, the primary beam and/or the reference beam is/are generated using in-situ tuned beamformers. For example, in FIG. 2, the fixed beamformer 120 and/or the fixed null beamformer 130 can be in-situ beamformers. These in-situ beamformers (e.g., fixed 120 and/or fixed null 130) can be beneficial in numerous implementations, including, for example, where the system 10 is part of a fixed communications system such as an audio and/or video conferencing system, public address system, etc., where seating positions or other user positions (e.g., standing locations) are known in advance. In particular cases, such as those where the beamformers include in-situ beamformers, during a setup process for the system 10 or a device incorporating the system 10, the in-situ beamformers use signal (e.g., voice) recordings from one or more specific user positions to calculate beamforming coefficients to enhance the signal to noise ratio to that position in the environment 5. In such cases, the processor 30 can be configured to initiate a setup process with the in-situ beamformers, for example, prompting a user 15 or users 15 to speak while located in one or more of the specific user positions, and calculating beamforming coefficients to enhance the signals (e.g., voice signals) from those positions.

In certain implementations, the echo canceler 180 removes audio rendered by the system 10 from the primary and reference signals via acoustic echo cancelation. For example, referring to FIG. 1, the output from transducer(s) 70 can impact the input signals detected at microphone(s) 20, and as such, echo canceling can improve sound pickup from desired direction(s) when transducer(s) 70 are providing audio output.

In various implementations, the desired signal relates to speech. In these cases, the system 10 is configured to enhance far field sound in the environment 5 that includes a speech, or voice, signal, e.g., the voice of one or more users 15 (FIG. 1). In these cases, the system 10 can be well suited to detect and enhance user speech signals in the far field, e.g., at approximately three (3) wavelengths or greater from the microphones 20.

In other implementations, the desired signal does not relate to speech. In these cases, the system 10 is configured to enhance far field sound in the environment 5 that does not include a user's voice signal, or excludes the user's voice signal. For example, the system 10 can be configured to enhance a far field sound including a signal other than a speech signal. Examples of far field sounds other than speech that may be desirably enhanced include, but are not limited to: i) pickup of sounds made by an instrument, including for example, pickup of isolated playback of a single instrument within a band or orchestra, and/or enhancement/amplification of sound from an instrument played within a noisy environment; ii) pickup of sounds made during a sporting event, such as the contact of a baseball bat on a baseball, a basketball swishing through a net, or a football player being tackled by another player; iii) pickup of sounds made by animals, such as movement of animals within an environment and/or animal sounds or cries (e.g., the bark of a dog, purr of a cat, howl of a wolf, neigh of a horse, roar of a lion, etc.); and/or iv) pickup of nature sounds, such as the rustling of leaves, crackle of a fire, or the crash of a wave. Pickup of far field sounds other than voice can be deployed in a number of applications, for example, to enhance functionality in one or more systems. For example, a monitoring device such as a child monitor and/or pet monitor can be configured to detect far field sounds such as the rustling of a baby or the bark of a dog and provide an alert (e.g., via a user interface) relating to the sound/activity.

In particular additional implementations, the system 10 can be part of a wearable device such as a wearable audio device and/or a wearable smart device and can aid in enhancing sound pickup, e.g., as part of a distributed audio system. In certain cases, the system 10 can be deployed in a hearing aid, for example, to aid in picking up the sound of others (e.g., a voice of a conversation partner or a desired signal source) in the far field in order to enhance playback to the hearing aid user of those sound(s). The system 10 can also be deployed in a hearing aid to reduce noise in the user's speech, e.g., as is detectable in the far field. Additionally, the system 10 can enable enhanced hearing for a hearing aid user, e.g., of far field sound.

In any case, the system 10 can beneficially enhance far field signal pickup with beamforming. Certain prior approaches, such as described in the '889 Patent, can beneficially enhance voice pickup in near field use scenarios, for example in user-worn audio devices such as headphones, earphones, audio eyeglasses, and other wearable audio devices. The various implementations disclosed herein can beneficially enhance far field signal pickup, for example, with beamformers that are focused on the far field and corresponding null formers in a target direction. At least one distinction between voice pickup in a user-worn audio device and sound (e.g., voice) pickup in the far field is that the far field system 10 disclosed according to various implementations cannot always benefit from a priori information about source locations. In various implementations, the source location(s) is rarely identified a priori, because for example, given user(s) 15 are seldom located in a fixed location within the environment 5 when speaking. Additionally, a given environment 5 (e.g., a conference room, large office space, meeting facility, transportation vehicle, etc.) can include multiple source location(s) such as seats, and the system 10 will not benefit from identifying which seats will be occupied prior to executing sound pickup processes according to implementations.

One or more of the above described systems and methods, in various examples and combinations, may be used to capture far field sound (e.g., voice signals) and isolate or enhance the those far field sounds relative to background noise, echoes, and other talkers. Any of the systems and methods described, and variations thereof, may be implemented with varying levels of reliability based on, e.g., microphone quality, microphone placement, acoustic ports, headphone frame design, threshold values, selection of adaptive, spectral, and other algorithms, weighting factors, window sizes, etc., as well as other criteria that may accommodate varying applications and operational parameters.

It is to be understood that any of the functions of methods and components of systems disclosed herein may be implemented or carried out in a digital signal processor (DSP), a microprocessor, a logic controller, logic circuits, and the like, or any combination of these, and may include analog circuit components and/or other components with respect to any particular implementation. Any suitable hardware and/or software, including firmware and the like, may be configured to carry out or implement components of the aspects and examples disclosed herein.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A method of sound enhancement for a system including microphones for far-field pick up, the method comprising:

generating, using at least two microphones, a primary beam focused on a previously unknown desired signal look direction, the primary beam producing a primary signal configured to enhance the desired signal;

generating, using at least two microphones, a reference beam focused on the desired signal look direction, the reference beam producing a reference signal configured to reject the desired signal; and removing, using at least one processor, components that correlate to the reference signal from the primary signal.

2. The method of claim 1, further comprising, prior to generating at least one of the primary beam or the reference beam, determining whether the desired signal is detected in an environment of the system, wherein the desired signal relates to voice and the determination of whether voice is detected in the environment of the system includes using voice activity detector processing.

3. The method of claim 1, wherein generating the reference beam uses the same at least two microphones used to generate the primary beam.

4. The method of claim 1, wherein at least one of the primary beam or the reference beam is generated using in-situ tuned beamformers.

5. The method of claim 1, wherein the desired signal look direction is selected by a user via manual input, wherein the desired signal look direction is selected automatically using beam selector technology.

6. The method of claim 1, further comprising:

prior to removing the components that correlate to the reference signal from the primary signal, generating, using at least two microphones, multiple beams focused on different directions to assist with selecting the primary beam for producing the primary signal.

7. The method of claim 1, further comprising removing, using the at least one processor, audio rendered by the system from the primary and reference signals via acoustic echo cancellation.

8. The method of claim 1, wherein the system includes at least one of a wearable audio device, a hearing aid device, a speaker, a conferencing system, a vehicle communication system, a smartphone, a tablet, or a computer.

9. The method of claim 1, wherein removing from the primary signal components that correlate to the reference signal includes filtering the reference signal to generate a noise estimate signal and subtracting the noise estimate signal from the primary signal, wherein the method further includes enhancing the spectral amplitude of the primary signal based upon the noise estimate signal to provide an output signal.

10. The method of claim 9, wherein filtering the reference signal includes adaptively adjusting filter coefficients, wherein adaptively adjusting filter coefficients includes at least one of a background process or monitoring when speech is not detected.

11. The method of claim 1, wherein generating at least one of the primary beam or the reference beam includes using superdirective array processing.

12. The method of claim 1, further comprising deriving the reference signal using a delay-and-sum technique from the at least two microphones used to generate the reference beam.

13. The method of claim 1, wherein the desired signal relates to speech, or wherein the desired signal does not relate to speech.

14. A system including:

a plurality of microphones for far-field pickup; and at least one processor configured to:

generate, using at least two of the microphones, a primary beam focused on a previously unknown desired signal look direction, the primary beam producing a primary signal configured to enhance the desired signal, generate, using at least two of the microphones, a reference beam focused on the desired signal look direction, the reference beam producing a reference signal configured to reject the desired signal, and remove components that correlate to the reference signal from the primary signal.

15. The system of claim 14, wherein the desired signal relates to speech, wherein removing components that correlate to the reference signal from the primary signal enhances beamforming for the desired signal look direction in the far field.

16. The method of claim 1, wherein the far field is defined as a distance of at least approximately one meter from the microphones.

17. The method of claim 2, wherein the previously unknown desired signal look direction is one of a plurality of signal look directions in the environment including the far field, and wherein the desired signal look direction is unknown until detecting the desired signal.

18. The method of claim 17, wherein removing components that correlate to the reference signal from the primary signal enhances beamforming for the desired signal look direction in the far field.

19. The method of claim 1, wherein generating the primary beam, generating the reference beam, and removing components that correlate to the reference signal from the primary signal are performed at startup of the system, and wherein the previously unknown desired signal look direction is unknown prior to startup of the system.

20. The system of claim 14, wherein the processor is further configured to, prior to generating at least one of the primary beam or the reference beam, determine whether the desired signal is detected in an environment of the system, wherein the desired signal relates to voice and the determination of whether voice is detected in the environment of the system includes using voice activity detector processing, wherein the previously unknown desired signal look direction is one of a plurality of signal look directions in the environment including the far field, and wherein the desired signal look direction is unknown until detecting the desired signal.

* * * * *